Patented Sept. 7, 1926.

1,598,880

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PROCESS OF PRODUCING CHEMICAL WOOD PULP.

No Drawing.     Application filed July 12, 1924. Serial No. 725,697.

In the production of cellulosic fibrous materials having a high proportion of resistant or alpha cellulose, this may be accomplished by digesting the unbleached pulp under certain conditions of time and temperature with a soluble alkali such as sodium carbonate, sodium sulphide, sodium hydroxide (and possibly sodium sulphite) or caustic lime in the course of which treatment a selective dissolving action takes place, with the result that the product contains a greater proportion of the resistant cellulose than was contained in the original pulp. The alkaline cooking agents react with the resinous components, the ligneous components and the less stable celluloses to form sodium combinations including such compounds as oxalates, acetates, saccharates and other soluble organic compounds. The spent liquor varies in color, and ranges from pale yellow to a pronounced coffee color,—that from an ordinary treatment being about the color of weak tea.

The present invention comprehends the recovery and reuse in the liberation of cellulose fibers from raw cellulosic materials such as wood, of the sodium (or soluble calcium) salts present in the spent liquor resulting from the alkaline treatment of pulp hereinbefore referred to. These soluble sodium or calcium salts or compounds in the spent liquor are no longer in a form in which they are useful as an active agent in cellulose fiber liberation inasmuch as the original causticity of the cooking liquor has practically been wholly destroyed. I have discovered, however, that they may be recovered for reuse in an acid cooking liquor in the production of sulphite pulp, by the employment of sulphur dioxide. For example, the spent cooking liquor resulting from the alkaline treatment of unbleached pulp may be used as the make-up liquid, instead of water, in the production of a sulphite cooking liquor for employment in the production of sulphite pulp, either by passing it and $SO_2$ in countercurrent flow through a mass of inert interstitial material, or through a lime tower, or else by employing it for slaking the lime in case the sulphite cooking liquor is formed by passing $SO_2$ through milk of lime. Hence the spent liquor containing the soluble salts or other organic compounds of sodium or calcium may be employed in the production of a sulphite cooking liquor having either sodium or calcium, or sodium and calcium as its basic constituent material or materials. In any event the inert soluble sodium or calcium compounds of the spent alkaline liquor are caused to react with $SO_2$ and form a sodium or calcium acid sulphite, which as thus recovered in a cooking liquor is employed in the production of unbleached sulphite pulp. Such unbleached pulp may now be treated with an alkaline liquor, such as hereinbefore referred to, for the production of a pulp high in resistant or alpha cellulose, and the spent liquor resulting therefrom containing the inert soluble sodium or calcium compounds may be utilized in the production of a sulphite cooking liquor for a fresh batch of wood chips.

Inasmuch as the sodium content of the spent alkaline liquor is relatively low (if it be made of sodium hydroxide for example), the regeneration of this liquor to an acid sodium sulphite cooking liquor by passing $SO_2$ therethrough would not, unless the sodium content were of sufficient concentration, result in a cooking liquor of sufficient strength. Consequently, such spent alkaline liquor may be best substituted as a part of the sodium carbonate or the calcium carbonate required to produce an acid sulphite cooking liquor. In the treatment of unbleached pulp to produce a product having an abnormally high content of resistant or alpha cellulose,—the total alkali required is about 100 pounds of, say, caustic soda per ton of pulp—whereas the lime required to produce the acid cooking liquor for making a ton of unbleached pulp is from 150 to about 200 pounds. Hence, under these conditions, the recovery of the inert soluble sodium compounds from the spent alkaline liquor is insufficient in amount to furnish an acid liquor of the strength of combined $SO_2$ required for a quick cook. Consequently, in such case, I prefer to utilize the recovered sodium content of the spent alkaline liquor together with sulphite, having as its basic constituent some raw make-up material such as sodium carbonate or calcium carbonate, in order to provide a cooking acid having a sufficient content of combined $SO_2$.

The wood chips for the production of unbleached sulphite pulp are cooked in the acid liquor derived in whole or in part from the spent alkaline liquor, under suitable conditions of time, temperature and pressure, and, after the digester contents are blown into the usual pit, the cellulose fibers are separated and washed and may now be subjected to the alkaline treatment hereinbefore described.

Instead of employing as the alkaline liquor for treating the unbleached pulp to produce one high in resistant cellulose, one comprising a solution of a sodium compound, lime (CaO) may be employed as the alkaline treating agent. This is of advantage when the original cooking liquor consists of calcium bisulphite, for the spent liquor may be treated with $SO_2$ in the manner hereinbefore described and thus employed as a cooking acid. The raw make-up materials in such case would consist of lime and such sulphur as may be necessary for the production of $SO_2$.

By my process it is possible to dispense with the evaporating concentrating and smelting process which is usually employed in recovering the sodium content of waste alkaline liquors, such as followed for example in the recovery processes utilized in the manufacture of sulphate or soda pulp.

In case the acid liquor produced by passing $SO_2$ into the spent liquor is turbid or contains some organic matter resulting from the precipitation of unstable cellulose which was originally dissolved from the alkaline-treated pulp, such organic matter may be removed by filtering or by settling to clarify the acid liquor.

What I claim is:—

1. A process as herein described, which comprises treating the spent liquor resulting from the alkaline digestion of unbleached cellulose pulp, with sulphur dioxide, and then cooking raw cellulosic material with the resulting acid liquor.

2. A process as herein described, which comprises digesting cellulose pulp with an alkaline solution for the production of a product high in resistant cellulose, and recovering and acidifying the spent liquor with $SO_2$ for the acid digestion of raw cellulosic material.

3. A process as herein described, which comprises digesting raw cellulosic material with an acid sulphite cooking liquor, separating the cellulose pulp, digesting such pulp in an alkaline solution to produce a product high in resistant cellulose, acidifying the spent alkaline liquor with $SO_2$, and using such acidified liquor in digesting raw cellulosic material.

4. A process as herein described, which comprises treating the spent liquor resulting from the alkaline digestion of cellulose pulp with sulphur dioxide to produce an acid cooking liquor, clarifying such liquor by removing the precipitated organic matter therefrom, and using such acidified liquor in the digestion of raw cellulosic material.

In testimony whereof I have affixed my signature.

GEORGE A. RICHTER.